US010786929B2

(12) United States Patent
Chuck et al.

(10) Patent No.: US 10,786,929 B2
(45) Date of Patent: Sep. 29, 2020

(54) MOLD INSERT ASSEMBLY

(71) Applicant: The Boeing Company, Chicago, IL (US)

(72) Inventors: Chen Chuck, Mercer Island, WA (US); Tunde A. Olaniyan, Snohomish, WA (US); David J. Barene, Arlington, WA (US); Zachariah B. Vandemark, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 156 days.

(21) Appl. No.: 16/139,449

(22) Filed: Sep. 24, 2018

(65) Prior Publication Data

US 2020/0094444 A1     Mar. 26, 2020

(51) Int. Cl.
| | |
|---|---|
| *B29C 33/48* | (2006.01) |
| *B29C 33/00* | (2006.01) |
| *B29C 43/36* | (2006.01) |
| *B29L 31/00* | (2006.01) |
| *B29L 31/30* | (2006.01) |

(52) U.S. Cl.
CPC ........ *B29C 33/485* (2013.01); *B29C 33/0033* (2013.01); *B29C 43/36* (2013.01); *B29C 2043/3668* (2013.01); *B29L 2031/3076* (2013.01); *B29L 2031/737* (2013.01)

(58) Field of Classification Search
CPC .... B29C 33/485; B29C 33/0033; B29C 43/36
See application file for complete search history.

(56) References Cited

U.S. PATENT DOCUMENTS

| | | | |
|---|---|---|---|
| 5,201,811 A | * | 4/1993 | Lebold .................... B22C 13/12 164/228 |
| 6,413,074 B1 | | 7/2002 | Hays |
| 2016/0186689 A1 | * | 6/2016 | Bartel ................... B29C 33/485 239/265.19 |

* cited by examiner

*Primary Examiner* — Jacob T Minskey
*Assistant Examiner* — Melody Tsui
(74) *Attorney, Agent, or Firm* — McDonnell Boehnen Hulbert & Berghoff LLP

(57) ABSTRACT

A mold insert assembly includes a base section having a base side removably attachable to a base plate of a mold and a first interface surface having a notched portion thereon. A first section includes a first interface side with a first interconnecting tab sized to engage the notched portion of the base section when the first interface side abuts the first interface surface, the first section further including an adjoining side having an interconnecting notch. A second section includes a second interface side having a second interconnecting tab, where the second interconnecting tab is sized to engage the interconnecting notch of the first section when the second interface side abuts the adjoining side, and where the base section, the first section, and the second section when assembled form a contoured insert configured to create a contoured cavity in a part formed within the mold.

20 Claims, 11 Drawing Sheets

MOLD INSERT ASSEMBLY

FIELD

The present disclosure generally relates to mold inserts and forming a part within a mold using a mold insert assembly.

BACKGROUND

Many aircraft components include complicated geometries that can make their manufacturing complex and time consuming. For example, a cascade thrust reverser panel in an aircraft engine may have dozens or even hundreds of individual vanes, each having a curvature that extends from one end of the panel to the other. Injection molding such a part can be impractical, as placing curved inserts within the mold to form the individual vanes would trap the inserts within the finished part, due to the geometry of the vanes. Removing the inserts would then require destroying them, increasing the labor, time, and cost of the manufacturing process. Consequently, such parts are traditionally manufactured layer-wise using a composite material, which is also labor-intensive and time consuming.

What is needed is an improved mold insert that can be used in the molding of a part that has an irregularly-shaped cavity, where the mold insert can be non-destructively removed from the part after it is molded.

SUMMARY

In one example, a mold insert assembly is described including a base section having a base side removably attachable to a base plate of a mold, the base section further including a first interface surface having a notched portion thereon. The mold insert assembly also includes a first section having a first interface side with a first interconnecting tab thereon, where the first interconnecting tab is sized to engage the notched portion of the base section when the first interface side abuts the first interface surface. The first section further includes an adjoining side having an interconnecting notch. The mold insert assembly also includes a second section having a second interface side, the second interface side having a second interconnecting tab, where the second interconnecting tab is sized to engage the interconnecting notch of the first section when the second interface side abuts the adjoining side, and where the base section, the first section, and the second section when assembled form a contoured insert configured to create a contoured cavity in a part formed within the mold.

In another example, a method of assembling a mold insert assembly is described. The method includes removably attaching a base side of a base section to a base plate of a mold, the base section further including a first interface surface having a notched portion thereon. The method also includes engaging a first interconnecting tab on a first interface side of a first section with the notched portion of the base section, where the first interface side of the first section abuts the first interface surface of the base section, the first section further including an adjoining side having an interconnecting notch. The method also includes engaging a second interconnecting tab on a second interface side of a second section with the interconnecting notch of the first section, where the second interface side of the second section abuts the adjoining side of the first section, and where the base section, the first section, and the second section when assembled form a contoured insert configured to create a contoured cavity in a part formed within the mold In another example, a method of forming a part within a mold is described. The method includes removably attaching a base side of a base section to a base plate of a mold, the base section further including a first interface surface having a notched portion thereon. The method also includes engaging a first interconnecting tab on a first interface side of a first section with the notched portion of the base section, where the first interface side of the first section abuts the first interface surface of the base section, the first section further including an adjoining side having an interconnecting notch. The method also includes engaging a second interconnecting tab on a second interface side of a second section with the interconnecting notch of the first section, where the second interface side of the second section abuts the adjoining side of the first section, wherein the base section, the first section, and the second section when assembled form a contoured insert configured to create a contoured cavity in a part formed within the mold. The method also includes forming the part within the mold around the contoured insert.

The features, functions, and advantages that have been discussed can be achieved independently in various examples or may be combined in yet other examples, further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

DETAILED DESCRIPTION

Disclosed examples will now be described more fully with reference to the accompanying Figures, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Examples discussed herein include mold insert assemblies and methods for assembling them, and methods for forming a part within a mold using a such a mold insert assembly. The mold insert assembly may include a base section, a first section, and a second section that interconnect to form a contoured insert, which in turn creates a contoured cavity within a part that is formed within a mold. The sections of the mold insert assembly may then be removed from the finished part in the same order, beginning with the base section. Accordingly, this may allow for not only the non-destructive removal, but also the re-use of the mold insert assembly, among other possible benefits.

By the term "about" or "substantial" and "substantially" or "approximately," with reference to amounts or measurement values, it is meant that the recited characteristic, parameter, or value need not be achieved exactly. Rather, deviations or variations, including, for example, tolerances, measurement error, measurement accuracy limitations, and other factors known to those skilled in the art, may occur in amounts that do not preclude the effect that the characteristic was intended to provide.

Figure 1:
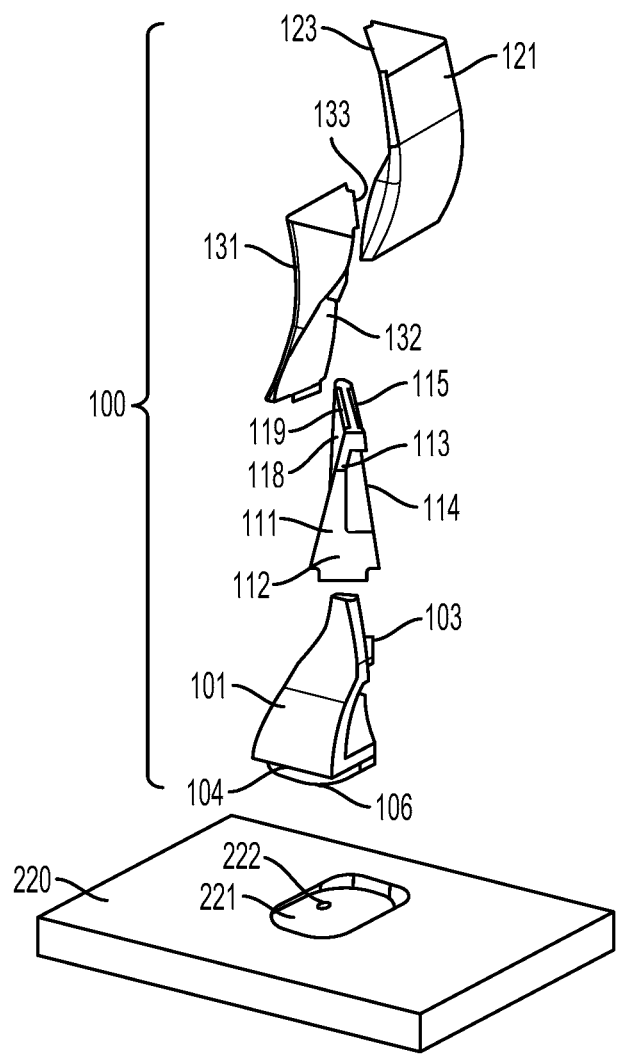
FIG. 1 illustrates an exploded perspective view of a mold insert assembly, according to an example implementation.
Figure 2:
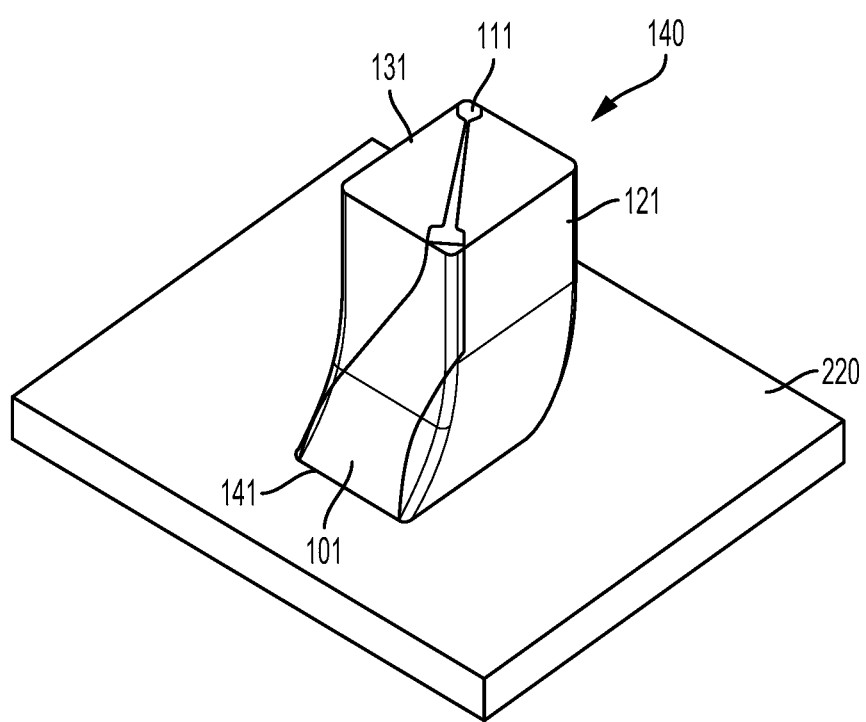
FIG. 2 illustrates a perspective view of a mold insert assembly assembled to form a contoured insert, according to an example implementation.

Referring now to FIGS. 1-2, a mold insert assembly 100 is shown in various stages of assembly, according to an example implementation. For example, FIG. 1 shows an exploded cross-sectional view of the mold insert assembly 100, including a base section 101 having a base side 104 that is removably attachable to a base plate 220. In some implementations, the base side 104 of the base section 101 may include a base protrusion 106 sized to engage a depression 221 in the base plate 220. Further, the base plate 220 may include a base plate aperture 222 that may be used to attach the base section 101 to the base plate 220, as will be further discussed below.

The side of the base section 101 that is not visible in FIG. 1 (see FIG. 6) further includes a first interface surface 102. The first interface surface 102 may include a notched portion 103, which may be used to stack additional sections of the mold insert assembly 100 together.

For example, the mold insert assembly 100 may also include a first section 111 having a first interface side 112 that has a first interconnecting tab 113. The first interconnecting tab 113 may be sized to engage the notched portion 103 of the base section 101 when the first interface side 112 abuts the first interface surface 102. The first section 111 also includes a first adjoining side 114 having a first interconnecting notch 115. For instance, as shown in FIG. 1, the first adjoining side 114 may be adjacent to the first interface side 112, and the first interconnecting notch 115 may be formed as a groove in a top surface of the first section 111. Additional views of the first section 111 are provided in FIGS. 7 and 8.

Figure 9:
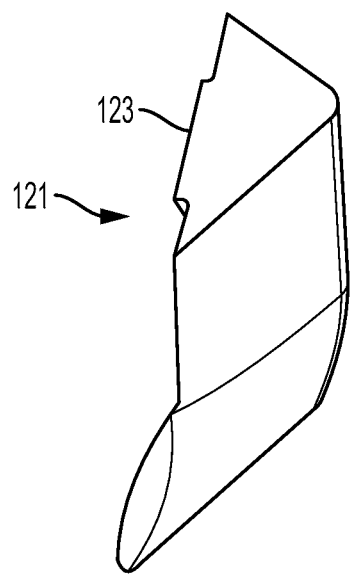
FIG. 9 illustrates another perspective view of a second part of a mold insert assembly, according to an example implementation.
Figure 10:
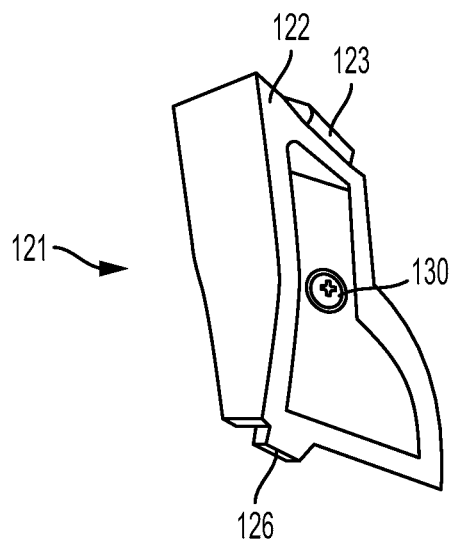
FIG. 10 illustrates a perspective view of a third part of a mold insert assembly, according to an example implementation.

The mold insert assembly 100 further includes a second section 121 having a second interface side 122, which is not clearly visible in FIG. 1 (see FIGS. 9 and 10). The second interface side 122 includes a second interconnecting tab 123, which may be sized to engage the first interconnecting notch 115 of the first section 111 when the second interface side 122 abuts the first adjoining side 114.

In some implementations, the mold insert assembly 100 may further include a third section 131, as shown in the example of FIG. 1. For instance, the first section 111 may include a second adjoining side 118 having a second interconnecting notch 119, and the third section 131 may include a third interface side 132 having a third interconnecting tab 133. The third interconnecting tab 133 may be sized to engage the second interconnecting notch 119 of the first section 111 when the third interface side 132 abuts the second adjoining side 118. For example, as shown in FIG. 1, the second adjoining side 118 may be adjacent to the first interface side 112, and the second interconnecting notch 119 maybe formed as a groove in the top surface of the first section 111, opposite the first interconnecting notch 115. Additional views of the third section 131 are provided in FIGS. 11 and 12.

Accordingly, and as shown in FIG. 2, the base section 101, the first section 111, the second section 121, and the third section 131 may form a contoured insert 140 when assembled. In some implementations, both the second section 121 and the third section 131 may also abut the base section 101 at the base side 104, forming a base cross-section 141 of the contoured insert 140 having a perimeter 142. Further, in some examples, the order of assembly the second section 121 and the third section 131 may be interchangeable, as either may be engaged with the first section 111 before the other.

Alternatively, the mold insert assembly 100 may include only a base section 101, a first section 111, and a second section 121. For example, based on the required geometry of the contoured insert 140, it may be possible to combine the first section 111 and the third section 131 into a single component. Thus, the base section 101, the first section 111, the second section 121 may form the contoured insert 140 shown in FIG. 2 when assembled.

In either configuration, it can be seen that the mold insert assembly 100 will tend to maintain its shape, and the interconnection of the sections, based on gravity. In particular, the first interconnecting tab 113 of the first section 111 rests atop the notched portion 103 of the base section 101, and each of the second section 121 and third section 131 rest atop the first section 111. Further, and as further discussed below, the bottom ends of each section may be constrained within the depression 221 of the base plate 220, preventing lateral movements at the bottom of the contoured insert 140 that might otherwise cause a section of the mold insert assembly 100 to separate from the others.

Figure 3:
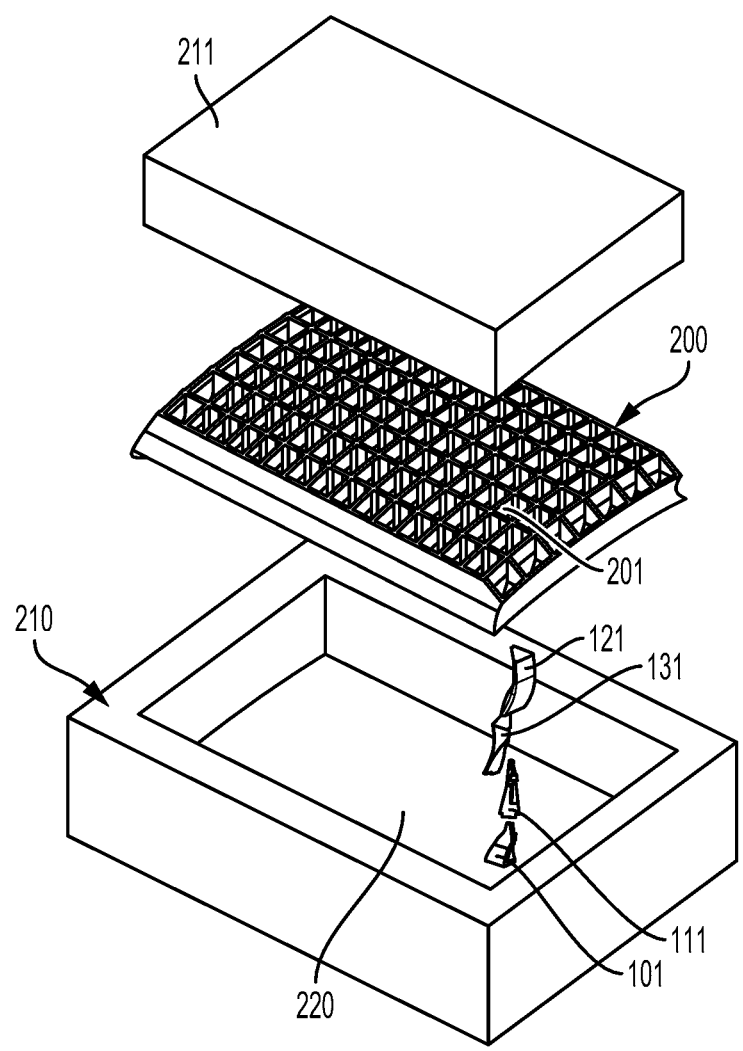
FIG. 3 illustrates a perspective view of a part formed within a mold, according to an example implementation.

FIG. 3 shows a part 200 formed within a mold 210 that includes a core 211. The mold insert assembly 100 is also shown, in exploded view, attached to the base plate 220 within the mold 210. The part 200 may be, for example, a cascade thrust reverser panel for use in an aircraft engine and may include a plurality of contoured cavities for redirecting air through the part 200, such as the contoured cavity 201 that is created by the contoured insert 140. Accordingly, the mold insert assembly 100 shown in FIG. 3 may be just one of many that are used in the molding process of the part 200. In some cases, each contoured cavity 201 in the part 200 may have a slightly different shape, and thus each mold insert assembly 100 used in the molding of the part 200 may have a slightly different geometry.

Figure 4:
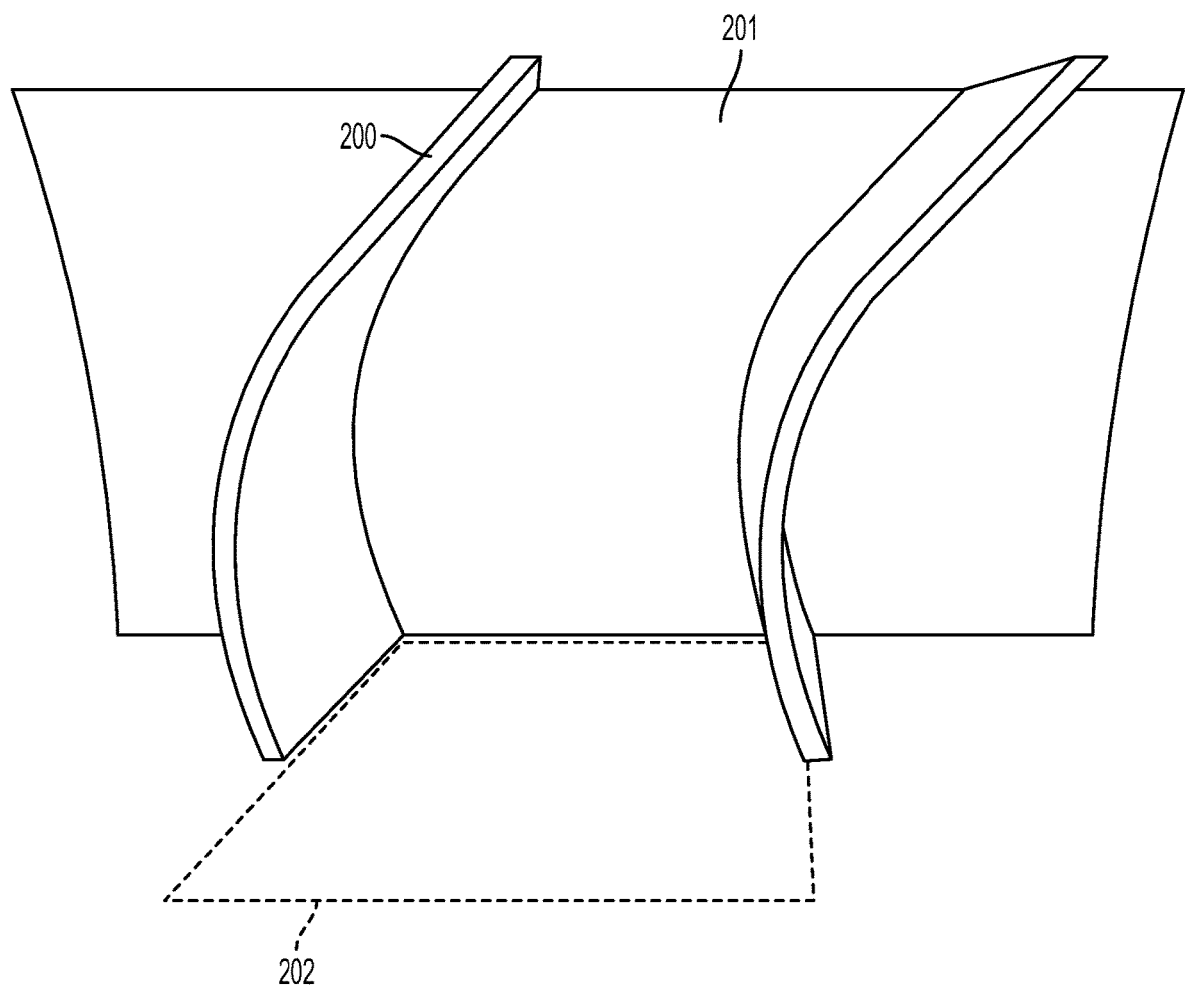
FIG. 4 illustrates a cross-sectional side view of a contoured cavity in a part, according to an example implementation.

FIG. 4 shows a cross-sectional side view of the contoured cavity 201 in the part 200. Although the mold insert assembly 100 is not shown for clarity, it can be seen that the perimeter 142 of the base cross-section 141 establishes an opening perimeter 202 of the contoured cavity 201 in the part 200. Further, it can be seen from the shape of the contoured cavity 201 that a monolithic mold insert would be trapped within the contoured cavity 201 upon forming the part 200.

Figure 5:
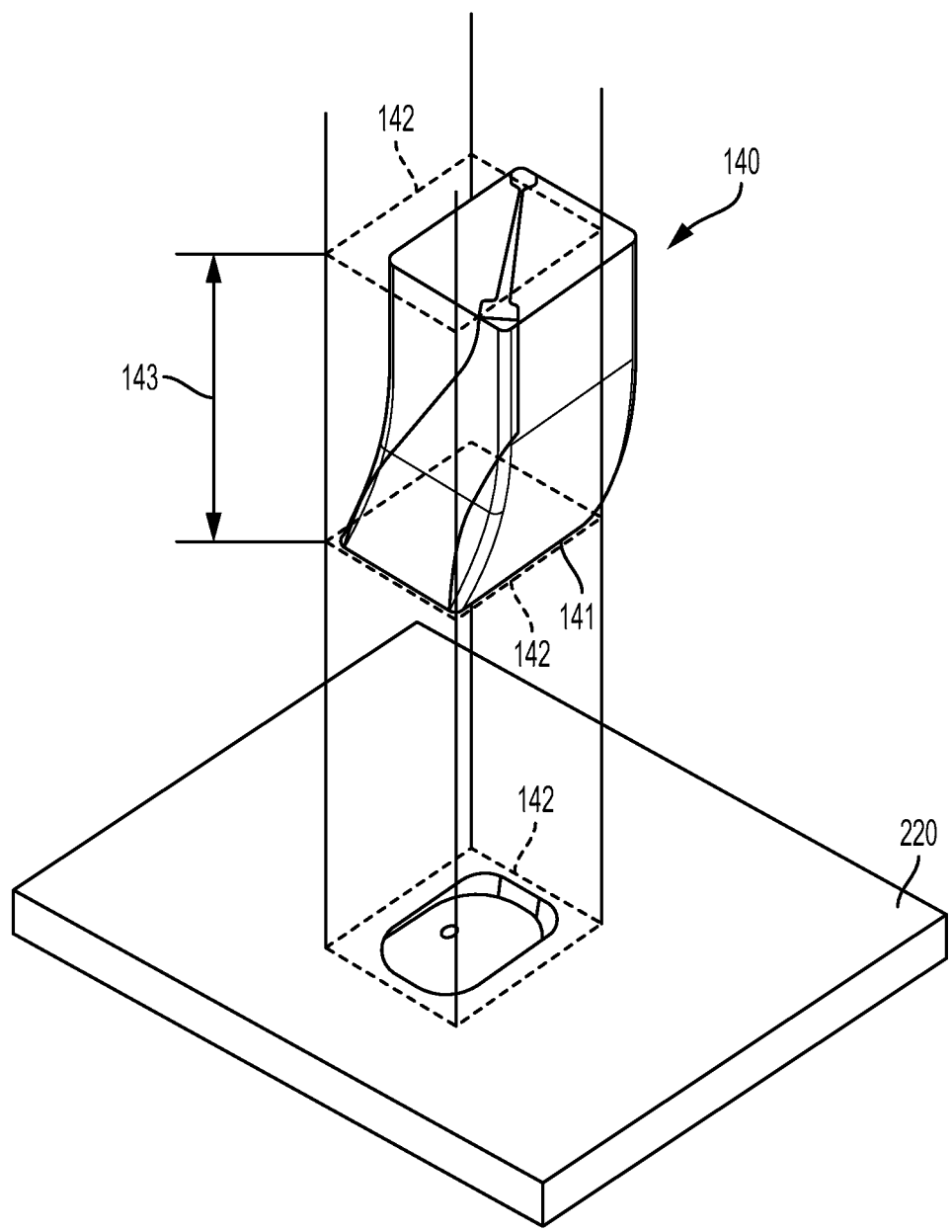
FIG. 5 illustrates a perspective view of a base part of a mold insert assembly, according to an example implementation.

The shape of the contoured insert 140 formed by the mold insert assembly 100 is further shown in FIG. 5, which illustrates a vertical projection of the perimeter 142 of the base cross-section 141. The base section 101, the first section 111, and the second section 121 each extend outside the perimeter 142 along a height 143 of the contoured insert 140.

Figure 6:
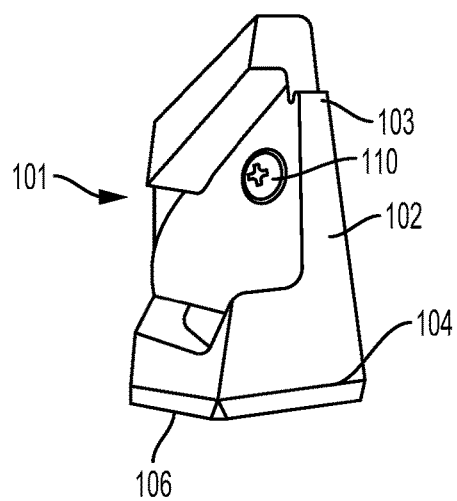
FIG. 6 illustrates a perspective view of a first part of a mold insert assembly, according to an example implementation.

Turning now to FIG. 6, an alternative perspective view of the base section 101 is shown, providing a clearer view of the first interface surface 102 and the notched portion 103. The base section 101 may also include a base fastener 110, which may be used to link the base section 101 to one or more of the other sections in the mold insert assembly 100, as further discussed below. For instance, the base fastener 110 may be a screw or a rivet, among other possibilities.

Figure 7:
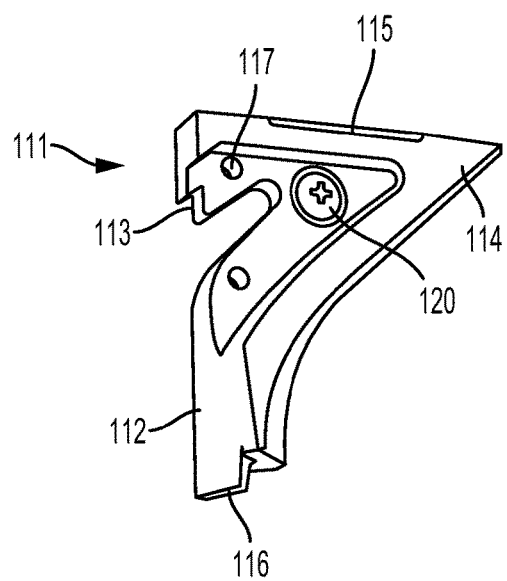
FIG. 7 illustrates another perspective view of a first part of a mold insert assembly, according to an example implementation.
Figure 8:
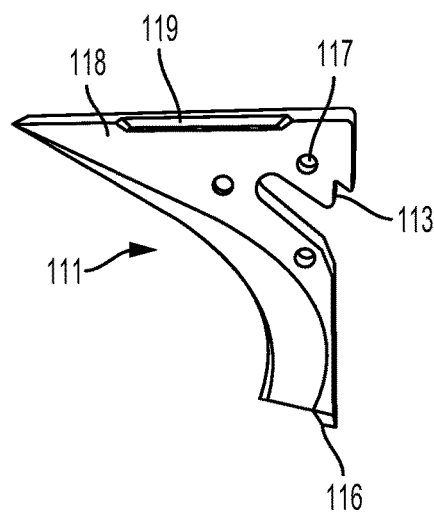
FIG. 8 illustrates a perspective view of a second part of a mold insert assembly, according to an example implementation.

FIGS. 7 and 8 provide two additional perspective views of the first section 111, with FIG. 7 showing the first adjoining side 114 and FIG. 8 showing the second adjoining side 118. In some implementations, the first section 111 may include a first fastener 120 similar to the base fastener 110. Further, the first section 111 may include a first section aperture 117, which may be used to link the first section 111 to one or more of the second section 121 and the third section 131, as will be discussed below. FIGS. 7 and 8 also show a first protrusion 116 extending from a bottom edge of the first section 111. The first protrusion 116 may be sized to engage the depression 221 in the base plate 220, similar to the base protrusion 106.

FIGS. 9 and 10 provide two additional perspective views of the second section 121, including a view of the second interface side 122 shown in FIG. 8. FIG. 8 also shows a second protrusion 126 extending from a bottom edge of the second section 121, which may be sized to engage the depression 221 in the base plate 220. The second section 121 may further include a second fastener 130, which may be used to link the second section 121 to one or more of the other sections.

Figure 11:
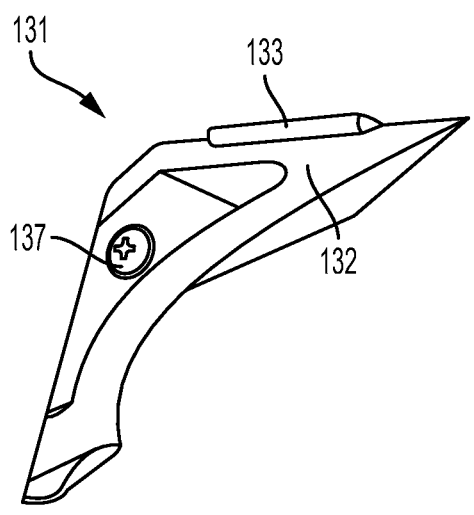
FIG. 11 illustrates another perspective view of a third part of a mold insert assembly, according to an example implementation.
Figure 12:
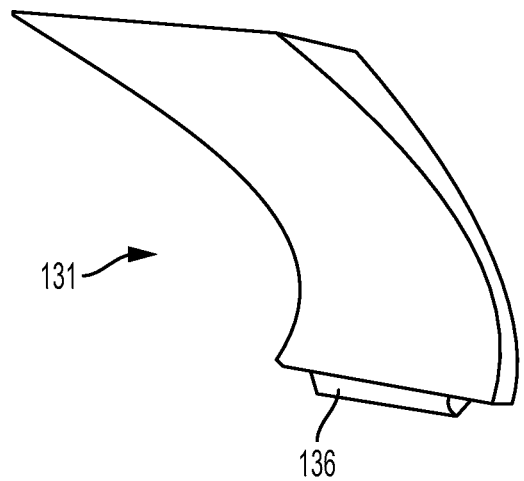
FIG. 12 illustrates another perspective view of a mold insert assembly assembled to form a contoured insert, according to an example implementation.

FIGS. 11 and 12 provide two additional perspective views of the third section 131, including a view of a third protrusion 136 extending from a bottom edge of the third section 131. As above, the third protrusion may be sized to engage the depression 221 in the base plate 220. The third section 131 may also include a third fastener 137, which may be used to link the third section 131 to one or more of the other sections.

Figure 13:
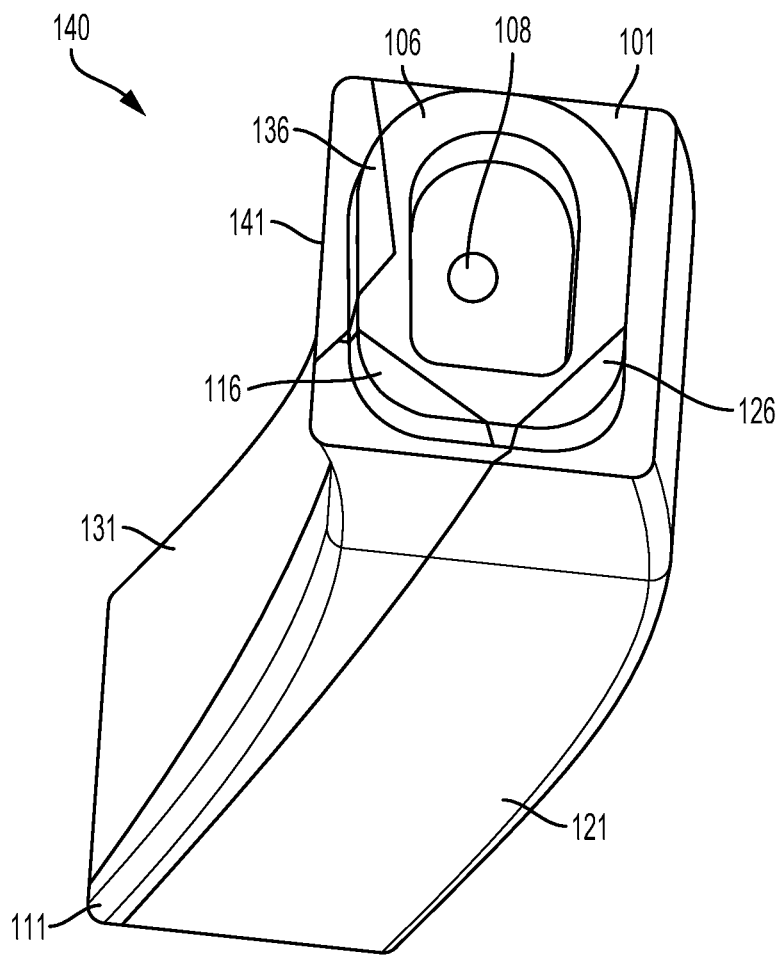
FIG. 13 illustrates an exploded perspective view of a mold insert assembly and attached cables, according to an example implementation

FIG. 13 shows a bottom view of the assembled contoured insert 140. In the example shown in FIG. 13, the base section 101, the first section 111, the second section 121, and the third section 131 each form a portion of the base cross-section 141. Further, the base protrusion 106 is shown with each of the first protrusion 116, the second protrusion 126, and the third protrusion 136 adjacent to it. Together, they are sized to engage the depression 221 in the base plate 220, helping to secure the contoured insert 140 in place within the mold 210. As noted above, this may help to constrain lateral movements at the bottom of each section when the contoured insert 140 is assembled and attached to the base plate 220.

FIG. 13 also illustrates a base aperture 108, which may be used to removably attach the base section 101 to the base plate 220. For instance, the base aperture 108 and the base plate aperture 222 may be aligned when the base section 101 is engaged in the depression 221, and a threaded screw or other faster may attach the base section 101 to the base plate 220.

As noted previously, the mold insert assembly 100 may be removable from the part 200 and the mold 210. For example, in some implementations, the contoured insert 140 may be separable by successively removing the base section 101, the first section 111, and then the second section 121 from the part 200, after the part 200 is formed within the mold 210.

As discussed above, the stacked arrangement of the interconnecting parts in the mold insert assembly 100 tends to hold the contoured insert 140 together under gravity. This configuration also allows for the sections to be separated in the same order that they were assembled. As can be seen in FIGS. 1 and 6, the sides of the base section 101 have a draft angle that allow the base section 101 to slide downward relative to the other sections (i.e., toward the base plate 220), while also disengaging the notched portion 103 from the first interconnecting tab 113. Accordingly, after the part 200 is formed in the mold 210, the base plate 220 may be removed and the base section 101 may be pulled out in the direction of the base plate 220. In some implementations, removing the base plate 220 may also remove the base section 101, due to their attachment.

Referring again to FIG. 13, it can be seen that removing the base section 101 will leave an empty space within the contoured cavity 201. This may allow the first section 111 to shift into this empty space, allowing it to move past the second section 121 and the third section 131 to be removed as well. As can be seen in FIG. 13, the sides of the first section adjacent to the second section 121 and third section 131 also have a draft angle allowing the first section 111 to slide out of the contoured cavity 201 in the same direction as the base section 101. Removal of the first section 111 creates even move space within the contoured cavity 201, allowing the second section 121 and third section 131 to be removed as well.

Figure 14:
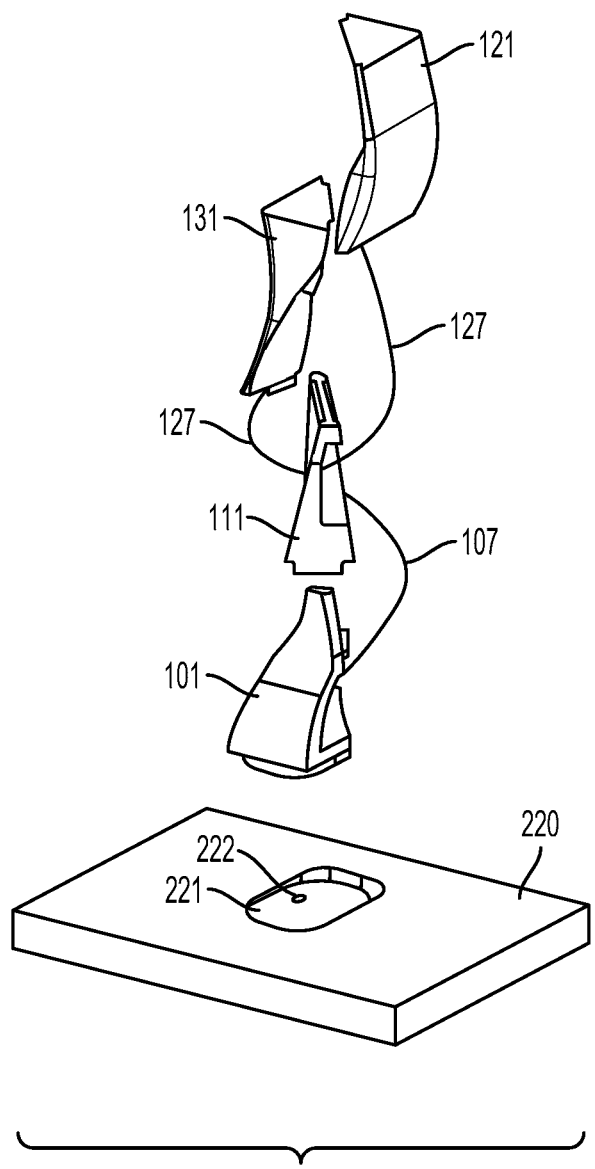
FIG. 14 illustrates a perspective bottom view of a mold insert assembly assembled to form a contoured insert, according to an example implementation

In some implementations, it may be desirable to link the sections of the mold insert assembly 100 together. For example, FIG. 14 shows an exploded, perspective view of the mold insert assembly 100 in which the individual sections are linked by a first cable 107 and a second cable 127. As noted above, the first cable 107 may be attached to the base section 101 via the base fastener 110, and the attached to the first section 111 via the first fastener 120.

Similarly, the second cable 127 may be attached between the second section 121 via the second fastener 130 and the third section 131 via the third fastener 137. Further, the second cable 127 may pass through the first section aperture 117. This may facilitate the removal process of the mold insert assembly 100 from the part 200. For instance, pulling out the base section 101 may pull the first section 111 via the first cable 107, and the first section 111 may pull both the second section 121 and third section 131 via the second cable 127. In addition, having the sections linked together in this way may reduce the chance that they become separated from each other.

In other embodiments, the sections of the mold insert assembly 100 may be linked sequentially, or in other different arrangements based on the particular shape of the contoured cavity 201, or the management of the one or more cables within the assembled contoured insert 140, among other considerations. Further, the cables may be joined to each of the sections using adhesives, or any other suitable attachment.

Figure 15:
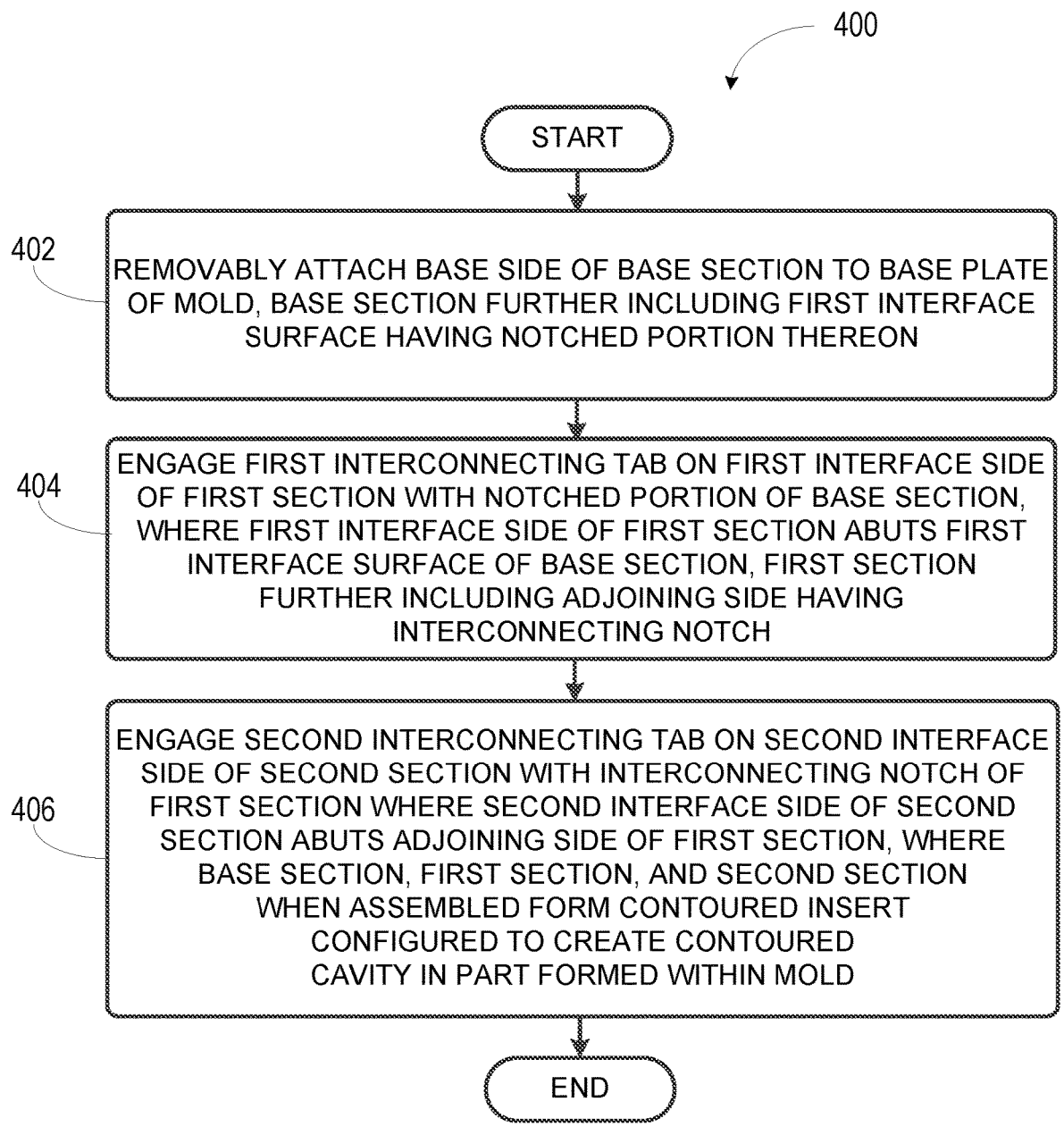
FIG. 15 shows a flowchart of an example method for assembling a mold insert assembly, according to an example implementation.
Figure 16:
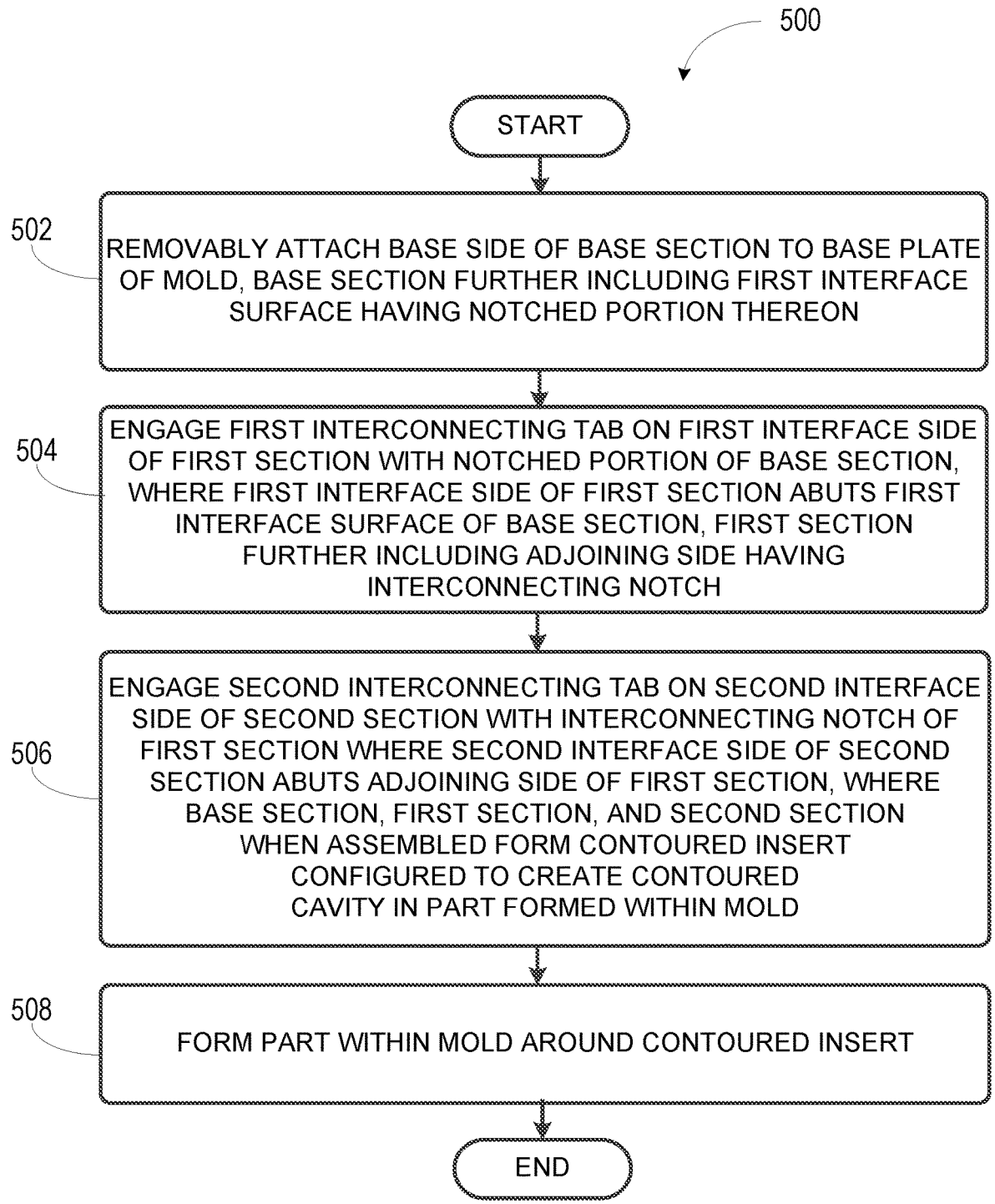
FIG. 16 shows a flowchart of an example method of forming a part within a mold, according to an example implementation.

Turning now to FIG. 15, a flowchart of a method 400 for assembling a mold insert assembly is shown, according to an example implementation. Similarly, FIG. 16 shows a flowchart of a method 500 of forming a part within a mold, according to another example implementation. Methods 400 and 500 shown in FIGS. 15 and 16 present examples of methods that, for instance, could be used with the mold insert assembly 100, as shown in FIGS. 1-14 and discussed herein. It should be understood that for these and other processes and methods disclosed herein, flowcharts show functionality and operation of one possible implementation of present examples. In this regard, each block in a flowchart may represent a module, a segment, or a portion of program code, which includes one or more instructions executable by a processor for implementing or causing specific logical functions or steps in the process. For example, the method 400 or the method 500 may be implemented by one or more computing devices of a robotic assembly system. Alternative implementations are included within the scope of the examples of the present disclosure, in which functions may be executed out of order from that shown or discussed, including substantially concurrently, depending on the functionality involved, as would be understood by those reasonably skilled in the art.

At block 402, the method 400 includes removably attaching a base side 104 of a base section 101 to a base plate 220 of a mold 210. The base section 101 may be, for example, the base section 101 discussed above. Accordingly, the base section 101 may further include a first interface surface 102 having a notched portion 103 thereon, as shown in FIGS. 1 and 6.

At block 404, the method 400 includes engaging a first interconnecting tab 113 on a first interface side 112 of a first section 111 with the notched portion 103 of the base section 101 when the first interface side 112 of the first section 111 abuts the first interface surface 102 of the base section 101. The first section 111 may be the first section as shown in FIGS. 7 and 8. Further, the first section 111 also includes a first adjoining side 114 having a first interconnecting notch 115, as noted previously.

At block 406, the method 400 includes engaging a second interconnecting tab 123 on a second interface side 122 of a second section 121 with the first interconnecting notch 115 of the first section 111, where the second interface side 122 of the second section 121 abuts the first adjoining side 114 of the first section 111. Further, the base section 101, the first section 111, and the second section 121 when assembled form a contoured insert 140, as shown in FIG. 2. The contoured insert 140 is configured to create a contoured cavity 201 in a part 200 formed within the mold 210, such as the part 200 and the mold 210 shown in FIG. 3.

In some implementations, the first section 111 further includes a second adjoining side 118 having a second interconnecting notch 119. Accordingly, the method 400 may further include engaging a third interconnecting tab 133 on a third interface side 132 of a third section 131 with the second interconnecting notch 119, where the third interface side 132 of the third section 131 abuts the second adjoining side 118 of the first section 111, as discussed previously. In such an implementation, the base section 101, the first section 111, the second section 121, and the third section 131 when assembled form the contoured insert 140.

In some embodiments, and with reference to FIG. 13 as discussed above, the base side 104 of the base section 101 may include a base protrusion 106, and where removably attaching the base side 104 of the base section 101 to the base plate 220 includes engaging the base protrusion 106 within a depression 221 in the base plate 220. The first section 111 may also include a first protrusion 116 and engaging the first interconnecting tab 113 on the first interface side 112 of the first section 111 with the notched portion 103 of the base section 101 also includes engaging the first protrusion 116 of the first section 111 within the depression 221 in the base plate 220.

Similarly, the second section 121 may include a second protrusion 126 and engaging the second interconnecting tab 123 on the second interface side 122 of the second section 121 with the first interconnecting notch 115 of the first section 111 may include engaging the second protrusion 126 within the depression 221 in the base plate 220.

In some implementations, the method 400 may include attaching a first cable 107 from the base section 101 to the first section 111, or order to facilitate removing the mold insert assembly 100 from the molded part 200. Further, the method 400 may also include attaching a second cable 127 from the second section 121, through a first section aperture 117 in the first section 111, to the third section 131, as discussed previously.

Turning now to FIG. 16, another flowchart is shown illustrating the method 500 of forming a part within a mold, such as the part 200 formed within the mold 201 as shown in FIG. 3, according to an example implementation.

At block 502, the method 500 includes removably attaching a base side 104 of a base section 101 to a base plate 220 of a mold 210. The base section 101 may be, for example, the base section 101 discussed above. Accordingly, the base section 101 may further include a first interface surface 102 having a notched portion 103 thereon, as shown in FIGS. 1 and 6.

At block 504, the method 500 includes engaging a first interconnecting tab 113 on a first interface side 112 of a first section 111 with the notched portion 103 of the base section 101 when the first interface side 112 of the first section 111 abuts the first interface surface 102 of the base section 101. The first section 111 may be the first section as shown in FIGS. 7 and 8. Further, the first section 111 also includes a first adjoining side 114 having a first interconnecting notch 115, as noted previously.

At block 506, the method 500 includes engaging a second interconnecting tab 123 on a second interface side 122 of a second section 121 with the first interconnecting notch 115 of the first section 111, where the second interface side 122 of the second section 121 abuts the first adjoining side 114 of the first section 111. Further, the base section 101, the first section 111, and the second section 121 when assembled form a contoured insert 140, as shown in FIG. 2. The contoured insert 140 is configured to create a contoured cavity 201 in a part 200 formed within the mold 210.

In some implementations, the first section 111 further includes a second adjoining side 118 having a second interconnecting notch 119. Accordingly, the method 500 may further include engaging a third interconnecting tab 133 on a third interface side 132 of a third section 131 with the second interconnecting notch 119, where the third interface side 132 of the third section 131 abuts the second adjoining side 118 of the first section 111, as discussed previously. In such an implementation, the base section 101, the first section 111, the second section 121, and the third section 131 when assembled form the contoured insert 140.

In some implementations, the method 500 may include attaching a first cable 107 from the base section 101 to the first section 111, to facilitate removing the mold insert assembly 100 from the molded part 200. Further, the method 500 may also include attaching a second cable 127 from the second section 121, through a first section aperture 117 in the first section 111, to the third section 131, as discussed previously.

At block 508, the method 500 includes forming the part 200 within the mold 210 around the contoured insert 140. As noted above, the mold insert assembly 100 may be just one of many within the mold 210, and forming the part 200 may include forming a corresponding plurality of contoured cavities.

After forming the part 200 within the mold 210, the method 500 may include removing the base section 101 from the contoured cavity 201. For example, as discussed above, the base plate 220 may be removed from the mold 210, allowing the base section 101 to be removed. After removing the base section 101, the method 500 may include removing the first section 111 from the contoured cavity 201. In an implementation in which the base section 101 and the first section 111 are linked via the first cable 107, removing the first section 111 may involve removing the first section 111 via the first cable 107.

After removing the first section 111, the method 500 may further include removing the second section 121 from the contoured cavity 201, as noted previously. In an implementation in which the second section 121 is linked to the first section 111 via the second cable 127, removing the second section may involve removing the second section 121 via the second cable 127. For instance, the second section 121 may be linked to the third section 131 by the second cable 127, which passes through the first section aperture 117. In other examples, the second section 121 may be linked directly to the first section 111 via the second cable 127. Other arrangements are also possible.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to explain the principles of the examples, the practical application, and to enable others of ordinary skill in the art to understand the disclosure for various examples with various modifications as are suited to the particular use contemplated

What is claimed is:

1. A mold insert assembly comprising:
   a base section having a base side removably attachable to a base plate of a mold, the base section further comprising a first interface surface having a notched portion thereon;
   a first section having a first interface side with a first interconnecting tab thereon, wherein the first interconnecting tab is sized to engage the notched portion of the base section when the first interface side abuts the first interface surface, the first section further comprising an adjoining side having an interconnecting notch;
   a second section having a second interface side, the second interface side having a second interconnecting tab, wherein the second interconnecting tab is sized to engage the interconnecting notch of the first section when the second interface side abuts the adjoining side; and
   wherein the base section, the first section, and the second section when assembled form a contoured insert configured to create a contoured cavity in a part formed within the mold.

2. The mold insert assembly of claim 1, wherein the adjoining side of the first section is a first adjoining side, wherein the interconnecting notch is a first interconnecting notch, and wherein the first section further comprises a second adjoining side having a second interconnecting notch, the mold insert assembly further comprising:
   a third section having a third interface side, the third interface side having a third interconnecting tab, wherein the third interconnecting tab is sized to engage the second interconnecting notch of the first section when the third interface side abuts the second adjoining side, wherein the base section, the first section, the second section, and the third section when assembled form the contoured insert.

3. The mold insert assembly of claim 2, further comprising a cable attachable from the base section to the first section.

4. The mold insert assembly of claim 3, wherein the cable is a first cable, wherein the mold insert assembly further comprises a second cable attachable from the second section, through an aperture in the first section, to the third section.

5. The mold insert assembly of claim 1, wherein, after the part is formed within the mold, the contoured insert is separable by successively removing the base section, the first section, and then the second section from the part.

6. The mold insert assembly of claim 1, wherein the contoured insert comprises a base cross-section having a perimeter, and wherein the base section, the first section, and the second section each extend outside the perimeter along a height of the contoured insert.

7. The mold insert assembly of claim 6, wherein the perimeter of the base cross-section establishes an opening perimeter of the contoured cavity in the part.

8. The mold insert assembly of claim 6, wherein the base section, the first section, and the second section each form a portion of the base cross-section.

9. The mold insert assembly of claim 8, wherein the base side of the base section comprises a base protrusion sized to engage a depression in the base plate of the mold, and wherein the first section comprises a first protrusion sized to engage the depression in the base plate.

10. The mold insert assembly of claim 9, wherein the second section comprises a second protrusion sized to engage the depression in the base plate.

11. A method of assembling a mold insert assembly comprising:
   removably attaching a base side of a base section to a base plate of a mold, the base section further comprising a first interface surface having a notched portion thereon,
   engaging a first interconnecting tab on a first interface side of a first section with the notched portion of the base section, wherein the first interface side of the first section abuts the first interface surface of the base section, the first section further comprising an adjoining side having an interconnecting notch;

engaging a second interconnecting tab on a second interface side of a second section with the interconnecting notch of the first section, wherein the second interface side of the second section abuts the adjoining side of the first section; and wherein the base section, the first section, and the second section when assembled form a contoured insert configured to create a contoured cavity in a part formed within the mold.

12. The method of claim 11, wherein the adjoining side of the first section is a first adjoining side, wherein the interconnecting notch is a first interconnecting notch, and wherein the first section further comprises a second adjoining side having a second interconnecting notch, the method further comprising:

engaging a third interconnecting tab on a third interface side of a third section with the second interconnecting notch, wherein the third interface side of the third section abuts the second adjoining side of the first section, wherein the base section, the first section, the second section, and the third section when assembled form the contoured insert.

13. The method of claim 12, further comprising:
attaching a cable from the base section to the first section.

14. The method of claim 13, wherein the cable is a first cable, the method further comprising:
attaching a second cable from the second section, through an aperture in the first section, to the third section.

15. The method of claim 11, wherein the base side of the base section comprises a base protrusion, wherein removably attaching the base side of the base section to the base plate further comprises engaging the base protrusion within a depression in the base plate, wherein the first section comprises a first protrusion, and wherein engaging the first interconnecting tab on the first interface side of the first section with the notched portion of the base section further comprises engaging the first protrusion of the first section within the depression in the base plate.

16. The method of claim 15, wherein the second section comprises a second protrusion, and wherein
engaging the second interconnecting tab on the second interface side of the second section with the interconnecting notch of the first section further comprises engaging the second protrusion within the depression in the base plate.

17. A method of forming a part within a mold, the method comprising:

removably attaching a base side of a base section to a base plate of a mold, the base section further comprising a first interface surface having a notched portion thereon;

engaging a first interconnecting tab on a first interface side of a first section with the notched portion of the base section, wherein the first interface side of the first section abuts the first interface surface of the base section, the first section further comprising an adjoining side having an interconnecting notch;

engaging a second interconnecting tab on a second interface side of a second section with the interconnecting notch of the first section, wherein the second interface side of the second section abuts the adjoining side of the first section, wherein the base section, the first section, and the second section when assembled form a contoured insert configured to create a contoured cavity in a part formed within the mold; and forming the part within the mold around the contoured insert.

18. The method of claim 17, further comprising:
after forming the part within the mold, removing the base section from the contoured cavity;
after removing the base section, removing the first section from the contoured cavity; and
after removing the first section, removing the second section from the contoured cavity.

19. The method of claim 18, wherein the adjoining side of the first section is a first adjoining side, wherein the interconnecting notch is a first interconnecting notch, and wherein the first section further comprises a second adjoining side having a second interconnecting notch, the method further comprising:

engaging a third interconnecting tab on a third interface side of a third section with the second interconnecting notch, wherein the third interface side of the third section abuts the second adjoining side of the first section, wherein the base section, the first section, the second section, and the third section when assembled form the contoured insert.

20. The method of claim 19, further comprising:
attaching a first cable from the base section to the first section; and
attaching a second cable from the second section, through an aperture in the first section, to the third section, wherein removing the first section from the contoured cavity comprises removing the first section via the first cable, and wherein the removing the second section from the contoured cavity comprises removing the second section via the second cable.

* * * * *